US012463359B2

(12) United States Patent
Park et al.

(10) Patent No.: US 12,463,359 B2
(45) Date of Patent: Nov. 4, 2025

(54) CONNECTOR COMPRISING MULTIPLE OUTPUTS

(71) Applicant: Tyco Electronics AMP Korea Co., Ltd., Gyeongsan (KR)

(72) Inventors: Hyun Sang Park, Gyeongsan-Si (KR); Hee Jun Lim, Gyeongsan-Si (KR)

(73) Assignee: Tyco Electronics AMP Korea Co., Ltd., Gyeongsan-Si (KR)

( * ) Notice: Subject to any disclaimer, the term of this patent is extended or adjusted under 35 U.S.C. 154(b) by 250 days.

(21) Appl. No.: 18/185,431

(22) Filed: Mar. 17, 2023

(65) Prior Publication Data

US 2023/0299514 A1 Sep. 21, 2023

(30) Foreign Application Priority Data

Mar. 18, 2022 (KR) ........................ 10-2022-0033792
Jan. 20, 2023 (KR) ........................ 10-2023-0008927

(51) Int. Cl.
*H01R 9/24* (2006.01)
*H01R 9/26* (2006.01)

(52) U.S. Cl.
CPC ......... *H01R 9/2458* (2013.01); *H01R 9/2675* (2013.01)

(58) Field of Classification Search
CPC .... H01R 9/2458; H01R 9/2675; H01R 25/14; H01R 13/113; H01R 13/6582; H01R 31/005
See application file for complete search history.

(56) References Cited

U.S. PATENT DOCUMENTS

| | | | | | |
|---|---|---|---|---|---|
| 5,213,518 | A | 5/1993 | Weidler | | |
| 5,214,314 | A * | 5/1993 | Dillard | H01R 25/16 | 307/42 |
| 6,575,777 | B2 * | 6/2003 | Henriott | H01R 25/162 | 439/654 |
| 7,252,524 | B1 * | 8/2007 | Johnson, Jr. | H05K 7/1457 | 439/118 |
| 7,494,356 | B2 * | 2/2009 | Byrne | H01R 13/113 | 439/215 |
| 2010/0184315 | A1 * | 7/2010 | Byrne | H01R 13/652 | 439/211 |
| 2014/0120767 | A1 | 5/2014 | Itsuki et al. | | |
| 2018/0212344 | A1 | 7/2018 | Li et al. | | |

FOREIGN PATENT DOCUMENTS

JP 2016-031825 A 3/2016

OTHER PUBLICATIONS

Extended European Search Report dated Jul. 18, 2023, corresponding to Application No. 23162458.6-1201, 9 pages.

* cited by examiner

*Primary Examiner* — Travis S Chambers

(57) ABSTRACT

A connector includes a case having an input and a plurality of outputs, a terminal housing in the case, a plurality of terminals in the terminal housing, and a bus bar disposed inside the terminal housing and connected to the terminals. At least one terminal of the terminals is exposed to an outside through any one of the outputs and is connectable to an external terminal inserted into the case. Another terminal of the terminals is exposed to the outside through another output of the outputs and is connectable to another external terminal inserted into the case. At least some of the bus bar is in the input and exposed to the outside of the case.

20 Claims, 12 Drawing Sheets

CONNECTOR COMPRISING MULTIPLE OUTPUTS

CROSS-REFERENCE TO RELATED APPLICATIONS

This application claims the benefit of the filing date under 35 U.S.C. § 119 (a)-(d) of Korean Patent Application No. 10-2022-0033792, filed on Mar. 18, 2022, and Korean Patent Application No. 10-2023-0008927, filed on Jan. 20, 2023.

FIELD OF THE INVENTION

The present disclosure relates to a connector including a plurality of outputs.

BACKGROUND

A connector is a type of electric component that allows or blocks an electrical connection. Connectors are used in various electromechanical devices, such as automobiles or home appliances, to enable an electrical and/or physical connection between a plurality of electronic components.

The above description is information the inventor(s) acquired during the course of conceiving the present disclosure, or already possessed at the time, and was not necessarily publicly known before the present application was filed.

SUMMARY

A connector includes a case having an input and a plurality of outputs, a terminal housing in the case, a plurality of terminals in the terminal housing, and a bus bar disposed inside the terminal housing and connected to the terminals. At least one terminal of the terminals is exposed to an outside through any one of the outputs and is connectable to an external terminal inserted into the case. Another terminal of the terminals is exposed to the outside through another output of the outputs and is connectable to another external terminal inserted into the case. At least some of the bus bar is in the input and exposed to the outside of the case.

BRIEF DESCRIPTION OF THE DRAWINGS

Aspects, features, and advantages of the present disclosure will become apparent and more readily appreciated from the following description of example embodiments, taken in conjunction with the accompanying drawings of which.

DETAILED DESCRIPTION OF THE EMBODIMENT(S)

Figure 1:
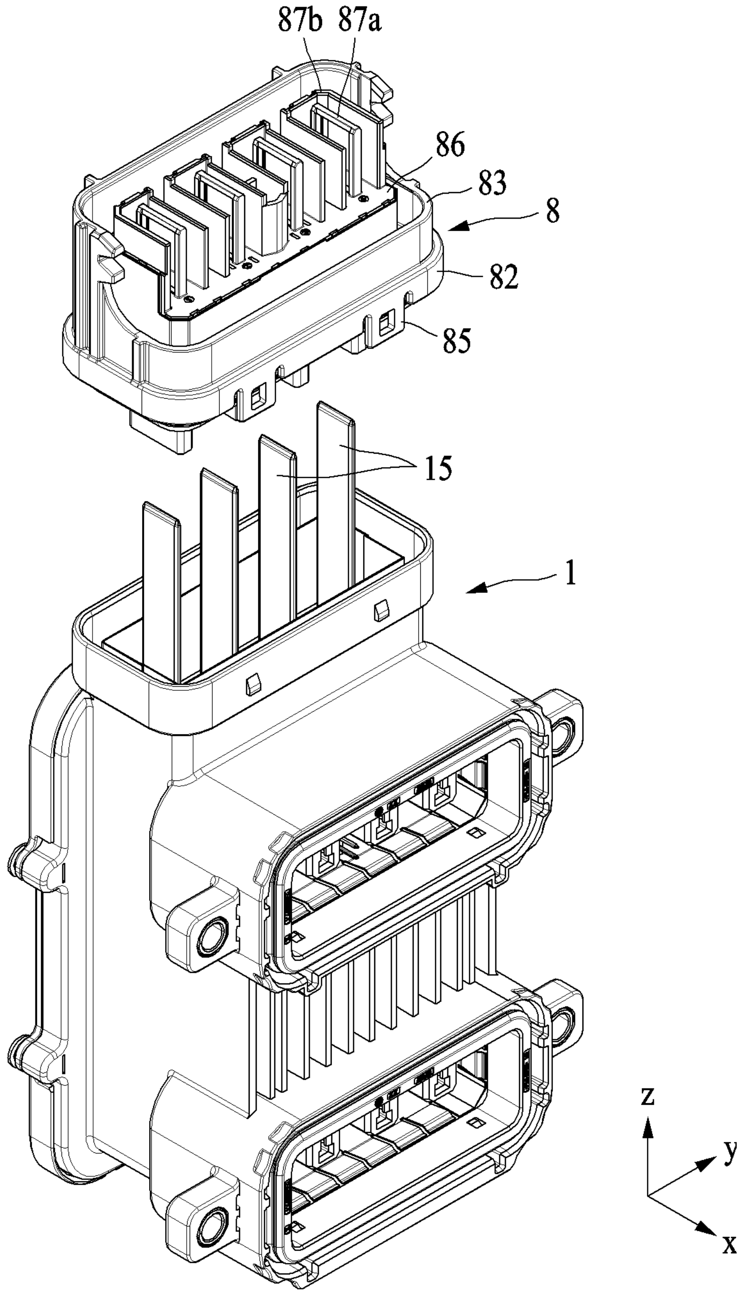
FIG. 1 is a perspective view illustrating a connector including a plurality of outputs, according to an embodiment.

Hereinafter, embodiments will be described in detail with reference to the accompanying drawings. The following description is one of several aspects of embodiments and the following description forms part of the detailed description of the embodiments. In describing an embodiment, a detailed description of a well-known function or configuration is omitted to clarify the present invention.

However, various alterations and modifications may be made to the embodiments. Here, the embodiments are not construed as limited to the disclosure. The embodiments should be understood to include all changes, equivalents, and replacements within the idea and the technical scope of the disclosure.

In addition, terms or words used in the present specification and claims should not be construed in general meanings or dictionary definitions, and based on a principle that the inventor may properly define the concept of terms to best describe their invention, the terms or words should be construed as meanings and concepts consistent with the technical idea of the invention according to an embodiment.

The singular forms “a”, “an”, and “the” are intended to include the plural forms as well, unless the context clearly indicates otherwise. It will be further understood that the terms “comprises/comprising” and/or “includes/including” when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being “connected”, “coupled”, or “attached” to another constituent element, it should be understood that one constituent element can be connected or attached directly to another constituent element, and an intervening constituent element can also be “connected”, “coupled”, or “attached” to the constituent elements.

The same name may be used to describe an element included in the embodiments and an element having a common function. Unless otherwise mentioned, the descriptions on the embodiments may be applicable to the following embodiments and thus, duplicated descriptions will be omitted for conciseness.

FIG. 1 is a perspective view illustrating a connector including a plurality of outputs, according to an embodiment.

Referring to FIG. 1, the connector including the outputs (hereinafter referred to as the “connector”), or a connector 1, may include an input and the outputs. The connector may be used for various purposes by including the input and the outputs. Referring to FIG. 1, the input may be in a +z direction and the outputs may be in a +x direction. The outputs may be spaced apart from one another in a z-axis direction. The connector 1 may include a case accommodating a plurality of bus bars 15 and a head part 8 that is detachable from the case.

The head part 8 may include a head outer plate 82, a head main plate 83, a head arm 85, a head body 86, and a plurality of head tips 87.

The head outer plate 82 may enclose at least some of the input of the connector 1. A head inner plate (not shown) may be inside the head outer plate 82. The head inner plate may be inside the connector 1.

At least some of the head main plate 83 may protrude in the +z direction. For example, the height of a portion of the head main plate 83 may be greater than the height of the head tips 87, and the height of the other portion of the head main plate 83 may be less than the height of the head tips 87. In this shape, the bus bars 15 may be protected from external impact, and a connection state with another connector may be readily verifiable with naked eyes.

The head arm 85 may be caught by the connector 1. For example, the head arm 85 may be extended from the head outer plate 82. The head arm 85 may protrude in a-z direction. The head arm 85 may be elastically transformed. When the head part 8 engages with the connector 1, the head arm 85 may be temporarily transformed outward. When the head part 8 fully engages with the connector 1, the head arm 85 may be restored to its original form and caught by the connector 1.

The head body 86 may be inside the head outer plate 82. The head body 86 may accommodate the bus bars 15.

The head tips 87 may protrude from the head body 86. The head tips 87 may protrude in the +z direction. The head tips 87 may support and/or protect the bus bars 15. The head tips 87 may include a tip body 87A and a tip cover 87B. The tip body 87A may support the bus bars 15. The tip body 87A may include a pair of ribs on both side walls. The pair of ribs may prevent the bus bars 15 from unintentionally deviating from the tip body 87A. The pair of ribs may support both walls of the bus bars 15. The tip cover 87B may enclose the tip body 87A. The tip cover 87B may protect the tip body 87A.

Figure 2:
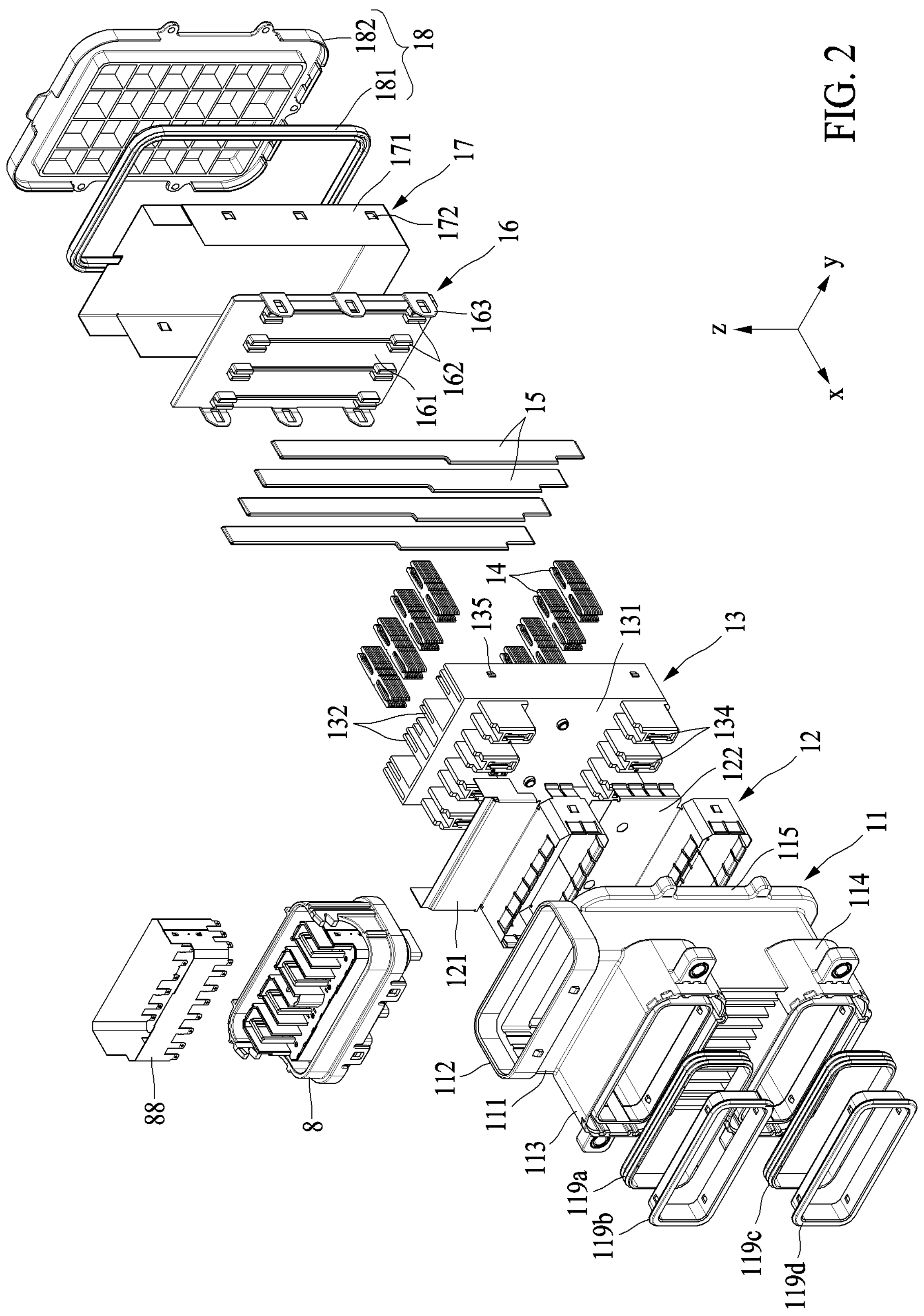
FIG. 2 is an exploded perspective view illustrating a connector according to an embodiment.

FIG. 2 is an exploded perspective view illustrating a connector according to an embodiment.

Referring to FIG. 2, the connector may include a case 11, an inner shield 12, a terminal housing 13, a terminal 14, a bus bar 15, a housing cover 16, an upper shield 17, a main cover 18, and a head part 8.

The case 11 may form the exterior of the connector. The case 11 may include a case body 111 including a hollow inside the case body 111, an input 112 exposing the hollow in one direction, and outputs 113 and 114 exposing the hollow in another direction. For example, the input 112 may expose the hollow in a +z direction and the outputs 113 and 114 may expose the hollow in a +x direction. The directions in which the input 112 and the outputs 113 and 114 expose the hollow may not be limited to the foregoing example. For example, although the input 112 and the outputs 113 and 114 are illustrated as exposing the hollow in directions orthogonal to each other, the input 112 and the outputs 113 and 114 may expose the hollow in directions opposite to each other. Although the outputs 113 and 114 are illustrated as exposing the hollow in the same direction, examples are not limited thereto. For example, one of the outputs 113 and 114 may expose the hollow in an x-axis direction and the other may expose the hollow in a y-axis direction.

The outputs 113 and 114 may include a first output 113 and a second output 114. The first output 113 and the second output 114 may be spaced apart from one another in a z-axis direction. The case 11 may include first waterproof parts 119A and 119B that are connected to the first output 113 and second waterproof parts 119C and 119D that are connected to the second output 114. The first waterproof parts 119A and 119B may include a first O-ring 119A attached to the inner wall of the first output 113 and a first waterproof frame 119B to fix the first O-ring 119A. The second waterproof parts 119C and 119D may include a second O-ring 119C attached to the inner wall of the second output 114 and a second waterproof frame 119D to fix the second O-ring 119C.

The inner shield 12 may be in the case 11. The inner shield 12 may function as a ground in the case 11. The inner shield 12 may be attached to the inner wall of the case 11. At least a portion of the inner shield 12 may be on the inner wall of the input 112. The other portion of the inner shield 12 may be on the inner walls of the outputs 113 and 114. The inner shield 12 may be physically and electrically connected to a shield of the head part 8. The inner shield 12 may be physically and electrically connected to a shield in another port (not shown) that is connected to the connector through the outputs 113 and 114. The inner shield 12 may include a first shield 121 and a second shield 122. The first shield 121 and the second shield 122 may be separable from each other. The inner shield 12 may be connected to the upper shield 17. The inner shield 12 may be integral.

The terminal housing 13 may be in the case 11. The terminal housing 13 may be inside the inner shield 12. The terminal housing 13 may support the terminals 14. Although the number of the terminals 14 may be illustrated as being 8 in the drawing, the number is not limited thereto. Every two of the terminals 14 may be connected to respective bus bars 15. The terminal housing 13 may include a housing plate 131, accommodating parts 132 and 134, and a housing protrusion 135. The housing plate 131 may be attached to the inner shield 12. The accommodating parts 132 and 134 may accommodate the terminals 14. The accommodating parts 132 and 134 may support the bus bars 15. The accommodating parts 132 and 134 may include a rear protrusion 132 protruding backward from the housing plate 131 and a front protrusion 134 protruding forward from the housing plate 131. In this case, forward may refer to the +x direction and backward may refer to a −x direction. The rear protrusion 132 may support the bus bars 15. The front protrusion 134 may be in the outputs 113 and 114. The housing protrusion 135 may protrude outward from the outer surface of the housing plate 131.

The terminal 14 may be in the terminal housing 13. The terminal 14 may be connected to the bus bar 15. The terminal 14 may include a first aperture accommodating the bus bar 15 and a second aperture accommodating an external terminal. The terminal 14 may include apertures in both directions. An aperture of the terminal 14 in one direction may grip the bus bar 15 and be physically and electrically connected to the bus bar 15. The other aperture of the terminal 14 in the other direction may grip a terminal (not shown) entering through the outputs 113 and 114 and be physically and electrically connected to the gripped terminal. The terminals 14 may be connected to the bus bar 15 in a direction intersecting a longitudinal direction of the bus bar 15.

The bus bars 15 may be provided. The bus bars 15 may be in the terminal housing 13. The bus bars 15 may be connected to the terminals 14. The bus bars 15 may be caught by the terminal housing 13.

The housing cover 16 may cover the bus bar 15. The housing cover 16 may include a cover plate 161, a bus bar supporter 162 that is on the cover plate 161 and supporting the bus bar 15, and a cover arm 163 that is on the inner wall of the cover plate 161 and connected to the terminal housing 13. The cover arm 163 may accommodate the housing protrusion 135. The housing cover 16 may be in a space enclosed by the inner shield 12 and the upper shield 17. The housing cover 16 may maintain its posture while fixed to the bus bar 15.

The upper shield 17 may enclose the terminal housing 13 and the housing cover 16. The upper shield 17 may be physically and electrically connected to the inner shield 12. The upper shield 17 and the inner shield 12 may enclose the inner space of the case 11. An edge of the upper shield 17 and an edge of the inner shield 12 may be connected to a head shield 88 of the head part 8. Both the upper shield 17 and the inner shield 12 may be connected to the head shield 88. The upper shield 17, the inner shield 12, and the head shield 88 may function as a ground. The upper shield 17, the inner shield 12, and the head shield 88 may block noise.

The main cover 18 may cover the case 11 when internal components of the connector are fully assembled. The main cover 18 may include a main O-ring 181 and a main plate 182. The main O-ring 181 may be attached to a rim of a portion, exposed backward, of the case 11. The main plate 182 may be connected to the case 11.

The head part 8 may be connected to the input 112. The head part 8 may include the head shield 88 inside the head part 8. The head shield 88 may be connected to an edge of the upper shield 17 and an edge of the inner shield 12. The head shield 88 may reduce noise in the head part 8. Although the head part 8 is illustrated as being in the +z direction of the case 11, examples are not limited thereto. For example, the head part 8 may be at least one of the −x direction, a +y direction, and a −y direction when the outputs 113 and 114 are in the +x direction of the case 11.

Figure 3:
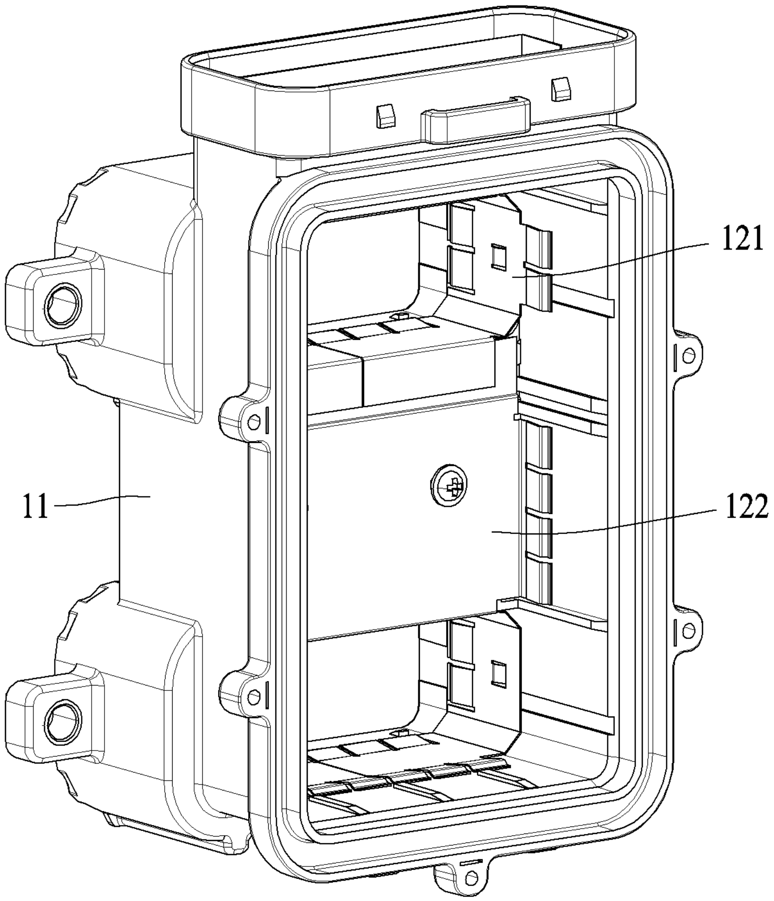
FIG. 3 is a perspective view illustrating a case and an inner shield, according to an embodiment.
Figure 4:
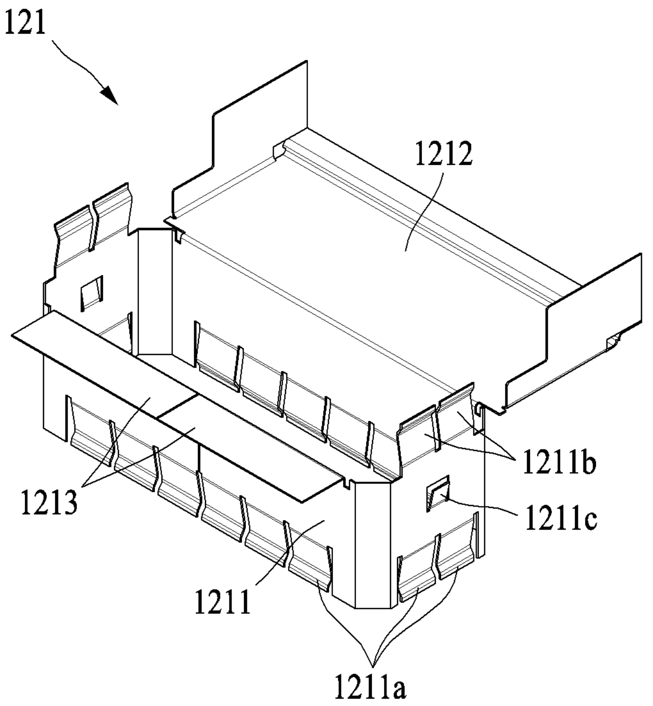
FIG. 4 is a perspective view illustrating a first shield of the inner shield according to an embodiment.
Figure 5:
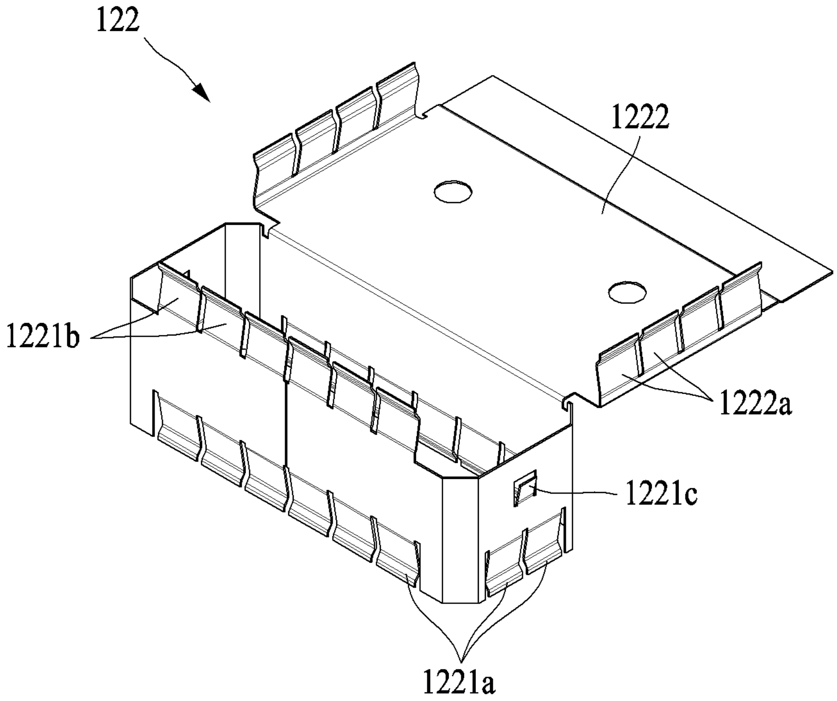
FIG. 5 is a perspective view illustrating a second shield of the inner shield according to an embodiment.

FIG. 3 is a perspective view illustrating a case and an inner shield, according to an embodiment, FIG. 4 is a perspective view illustrating a first shield of the inner shield according to an embodiment, and FIG. 5 is a perspective view illustrating a second shield of the inner shield according to an embodiment.

Referring to FIGS. 3 to 5, a first shield 121 and a second shield 122 may be in a case 11.

The first shield 121 may include a first shield body 1211, a first shield head 1212, and a first shield plate 1213. The first shield body 1211 may be in any one of a plurality of outputs of the case 11. The first shield head 1212 may be extended from the first shield body 1211. The first shield plate 1213 may be extended from the first shield body 1211. The first shield head 1212 and the first shield plate 1213 may be opposite to each other with respect to the first shield body 1211. The first shield plate 1213 may overlap with the second shield 122. The first shield head 1212 may be connected to a head shield. The first shield head 1212 may be inside an input. The first shield head 1212 may be referred to as a shield head herein.

The first shield body 1211 may include a first shield outer arm 1211A that is connected to another shield (not shown) entering the connector through the output, a first shield inner arm 1211B that is connected to an upper shield (e.g., the upper shield 17 of FIG. 2), and a first shield fixing arm 1211C to fix the first shield body 1211 to the output. The first shield outer arm 1211A may be inside the output. The first shield inner arm 1211B may overlap with the upper shield. The first shield outer arm 1211A, the first shield inner arm 1211B, and the first shield fixing arm 1211C may apply an elastic force to the other shield or the inner wall of the case 11.

The second shield 122 may include a second shield body 1221 and a second shield plate 1222. The second shield body 1221 may be in another output of the outputs of the case 11. The second shield plate 1222 may be extended from the second shield body 1221.

The second shield body 1221 may include a second shield outer arm 1221A that is connected to the other shield (not shown) entering the connector through the output, a second shield inner arm 1221B that is connected to the upper shield (e.g., the upper shield 17 of FIG. 2), and a second shield fixing arm 1221C to fix the second shield body 1221 to the output. The second shield outer arm 1221A, the second shield inner arm 1221B, and the second shield fixing arm 1221C may apply an elastic force to the other shield or the inner wall of the case 11. The second shield plate 1222 may include a second shield plate arm 1222A. The second shield plate arm 1222A may be connected to the upper shield (e.g., the upper shield 17 of FIG. 2).

The first shield outer arm 1211A and the second shield outer arm 1221A may be referred to as a shield outer arm herein. The first shield inner arm 1211B, the second shield inner arm 1221B, and the second shield plate arm 1222A may be referred to as a shield inner arm herein.

Figure 6:
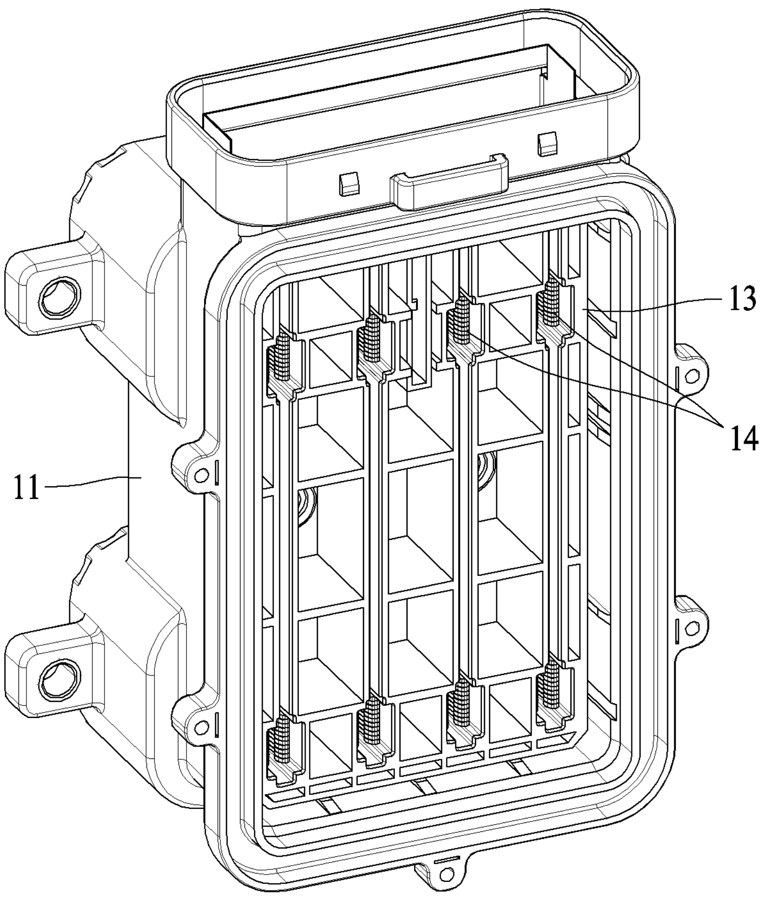
FIG. 6 is a perspective view illustrating the case, a terminal housing, and a terminal, according to an embodiment.
Figure 7:
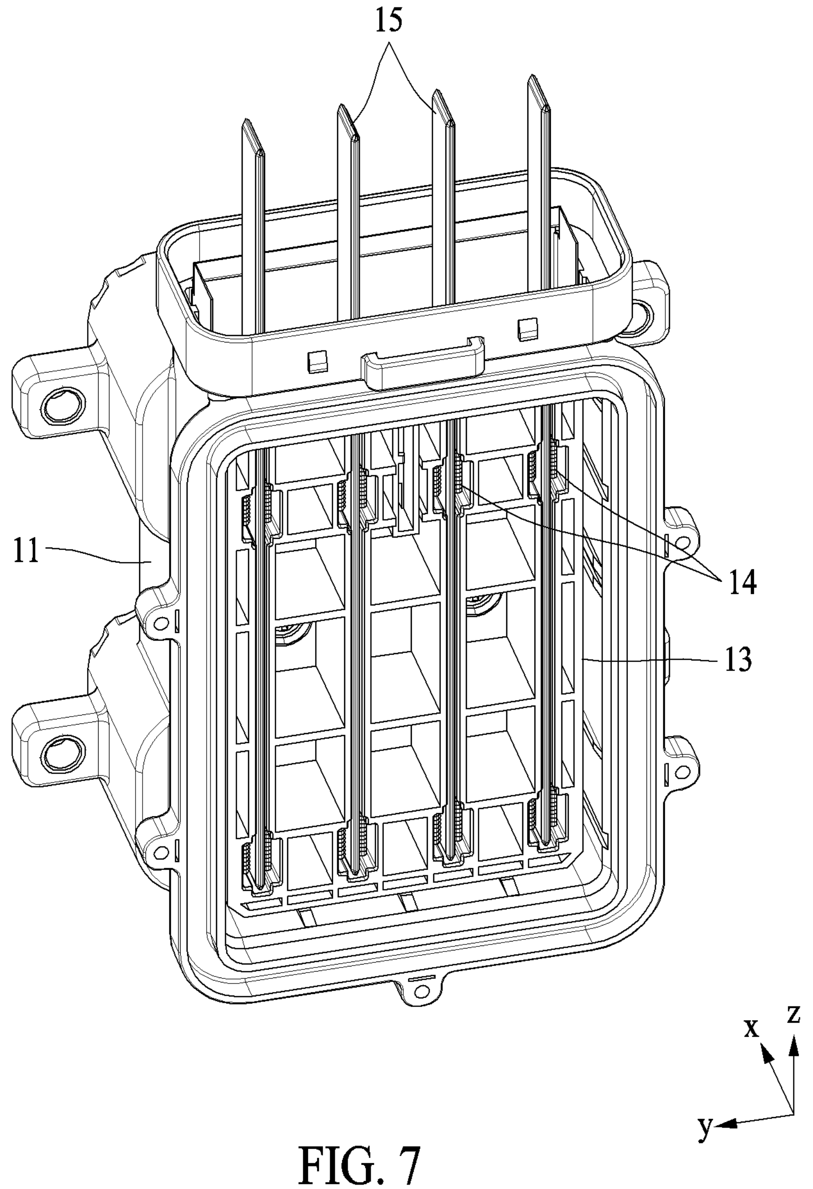
FIG. 7 is a perspective view illustrating a bus bar assembled to the terminal housing according to an embodiment.

FIG. 6 is a perspective view illustrating the case, a terminal housing, and a terminal, according to an embodiment, and FIG. 7 is a perspective view illustrating a bus bar assembled to the terminal housing according to an embodiment.

Referring to FIGS. 6 and 7, a terminal housing 13 may be in a case 11, and the terminal housing 13 may accommodate a plurality of terminals 14. A bus bar 15 may be in the terminal housing 13, in which an upper edge of the bus bar 15 enters the case 11 in a +x direction and passes through an input in a +z direction. When the bus bar 15 is in the terminal housing 13, the terminals 14 may be connected to the bus bar 15.

Figure 8:
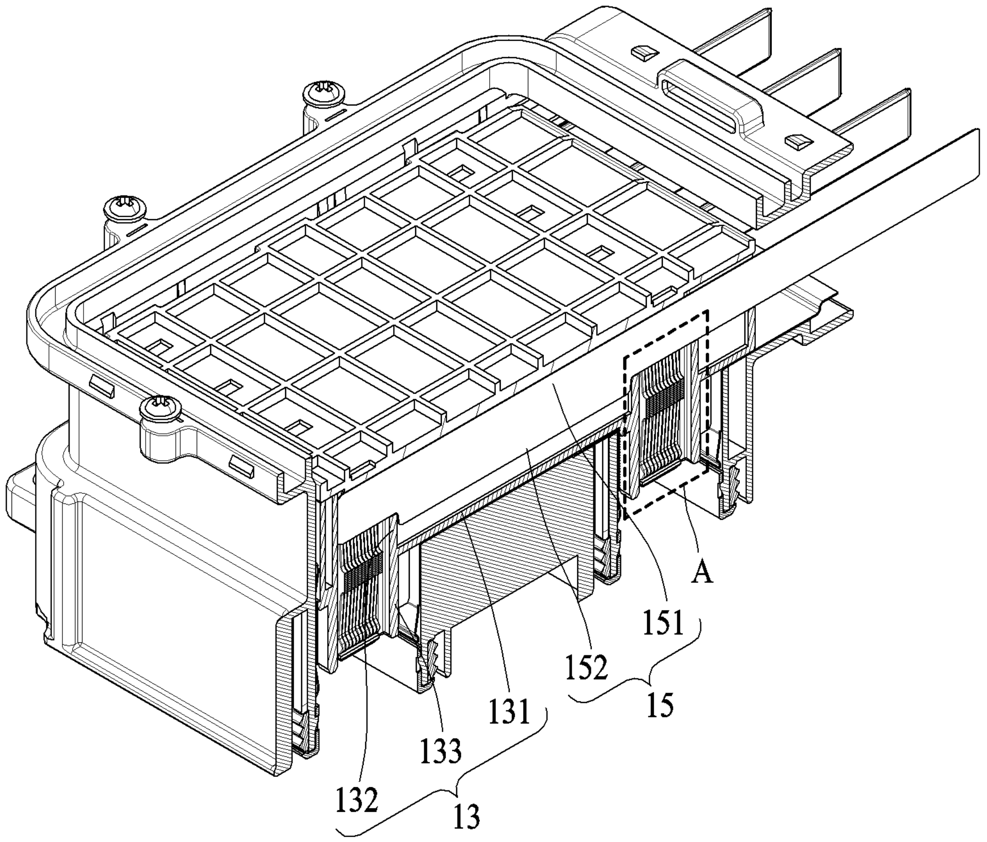
FIG. 8 is a cross-sectional perspective view illustrating the connector according to an embodiment.
Figure 9:
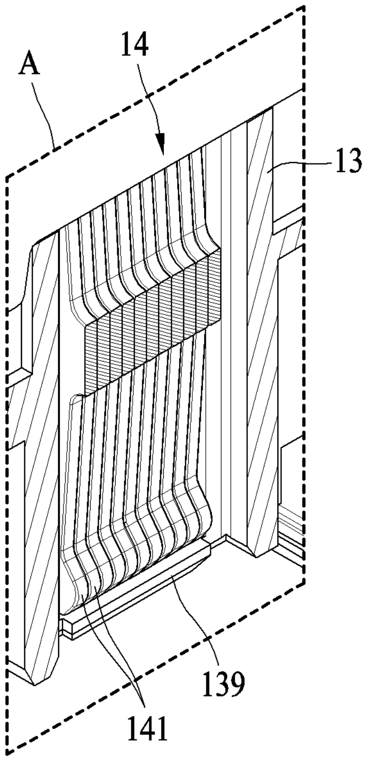
FIG. 9 is a cross-sectional view magnifying a portion A of FIG. 8.

FIG. 8 is a cross-sectional perspective view illustrating the connector according to an embodiment, and FIG. 9 is a cross-sectional view magnifying a portion A of FIG. 8.

Referring to FIGS. 8 and 9, a terminal housing 13 may include a housing plate 131 and accommodating parts 132 and 133. The accommodating parts 132 and 133 may include a rear protrusion 132 protruding backward from the housing plate 131 and a front protrusion 133 protruding forward from the housing plate 131.

The rear protrusion 132 may support a bus bar 15. The front protrusion 133 may be inside a protrusion of a case. The bus bar 15 may be in the accommodating parts 132 and 133 and be spaced apart from the housing plate 131. In this structure, a contact area of the bus bar 15 and the terminal housing 13 may be reduced, an air layer may be between the bus bar 15 and the housing plate 131, and accordingly, an excessive increase of temperature of the bus bar 15 may be reduced or blocked. The terminal housing 13 may include a housing arm 139. The housing arm 139 may support the terminal 14. The width of the terminal 14 may be greater than the housing arm 139. The terminal 14 may be caught by the housing arm 139.

The bus bar 15 may include a bus bar body 151 in a plate shape and a bus bar rib 152 protruding from the bus bar body 151 and inserted into the terminal housing 13. For example, the bus bar rib 152 may be inserted between two rear protrusions 132 that are spaced apart from each other. The bus bar rib 152 may be caught by the two rear protrusions 132. The movement of the bus bar 15 in a longitudinal direction may be reduced or blocked by the two rear protrusions 132.

The terminal 14 may include a plurality of terminal plates 141 parallel to one another in the longitudinal direction of the bus bar 15. The terminal plates 141 may overlap with one another. Although one terminal 14 is illustrated as including eleven terminal plates 141 in the drawing, the number thereof is not limited thereto.

Figure 10:
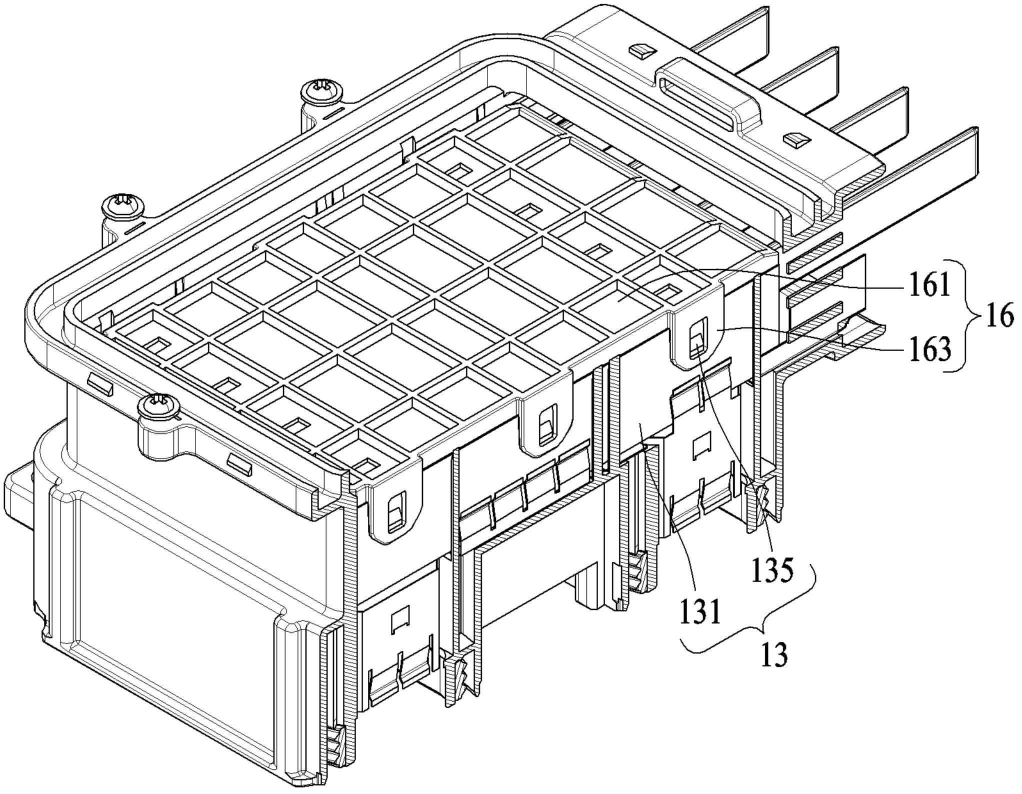
FIG. 10 is a cross-sectional perspective view illustrating the connector according to an embodiment.

FIG. 10 is a cross-sectional perspective view illustrating the connector according to an embodiment.

Referring to FIG. 10, a housing cover 16 may include a cover plate 161 and a cover arm 163. An upper shield 17 may include a shield body 171 and a shield protrusion 172 (FIG. 2). The shield body 171 may be connected to an inner shield (e.g., the inner shield 12 of FIG. 2). The cover arm 163 may be caught by the shield protrusion 172.

Figure 11:
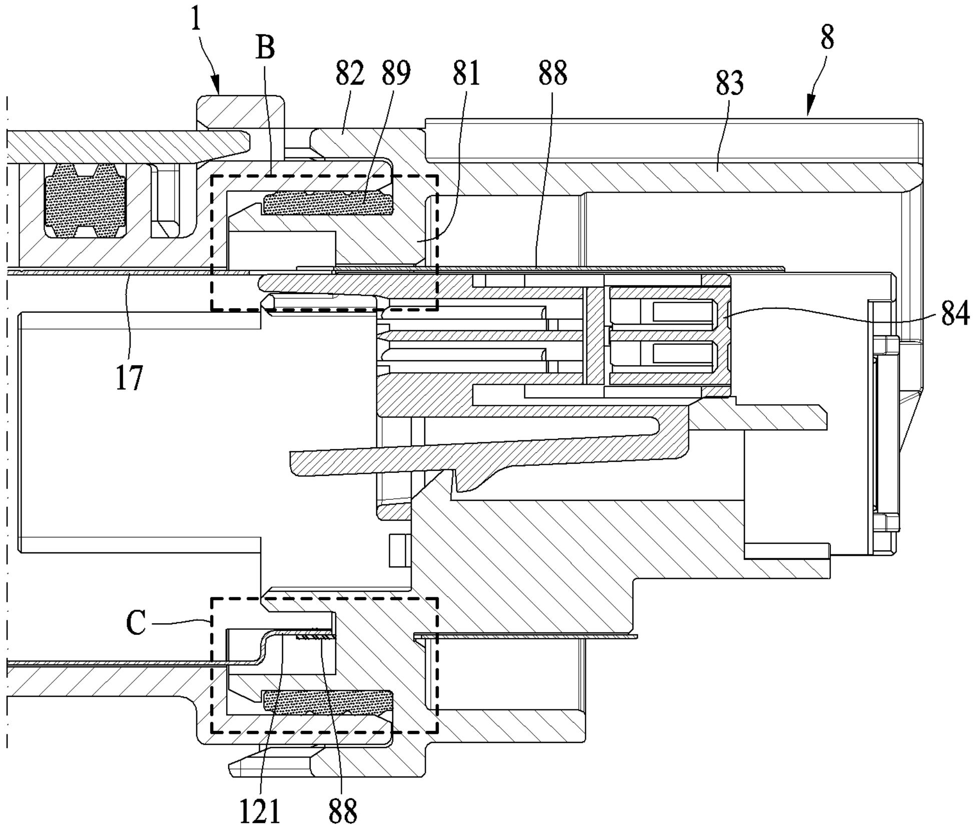
FIG. 11 is a cross-sectional view illustrating the connector according to an embodiment.
Figure 12:
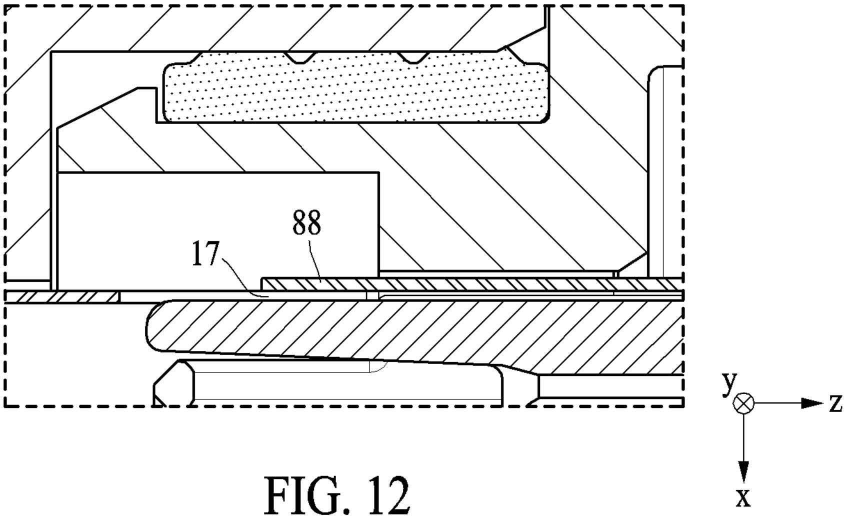
FIG. 12 is a cross-sectional view magnifying a portion B of FIG. 11.

FIG. 11 is a cross-sectional view illustrating the connector according to an embodiment. FIG. 12 is a cross-sectional view magnifying a portion B of FIG. 11, and FIG. 13 is a cross-sectional view magnifying a portion C of FIG. 11.

Figure 13:
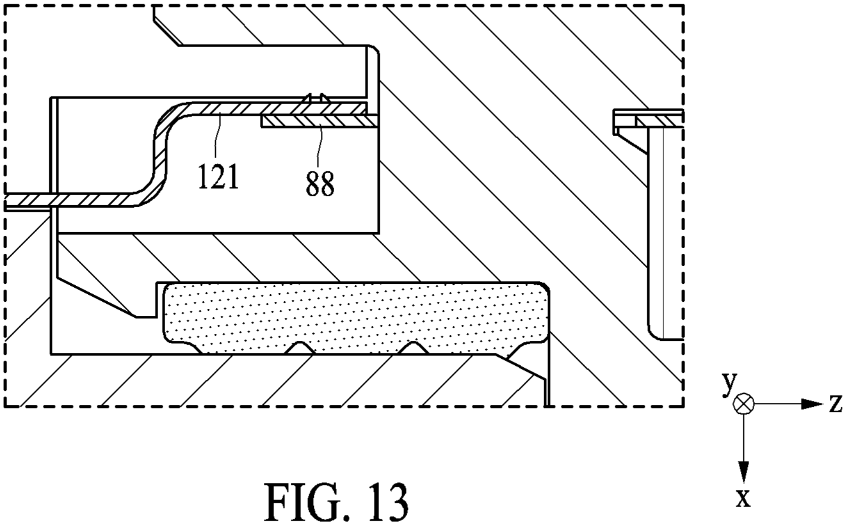
FIG. 13 is a cross-sectional view magnifying a portion C of FIG. 11.

Referring to FIGS. 11 to 13, a connector 1 may include a head part 8 that is connected to an input of a case. The head part 8 may include a head inner plate 81, a head outer plate 82, a head main plate 83, a head terminal 84, a head shield 88, and a head O-ring 89.

The head inner plate 81 may be inside the input of the case. The head outer plate 82 may be outside the input of the case. The head main plate 83 may be extended in a direction from the head inner plate 81 and the head outer plate 82. The head terminal 84 may be in the head inner plate 81 and the head main plate 83. The head O-ring 89 may be in a compressed state and between the head inner plate 81 and the inner wall of the input of the case.

The head shield 88 may overlap with an upper shield 17. The head shield 88 may be connected to the upper shield 17. The head shield 88 may overlap with a first shield 121. The head shield 88 may be connected to the first shield 121.

Figure 14:
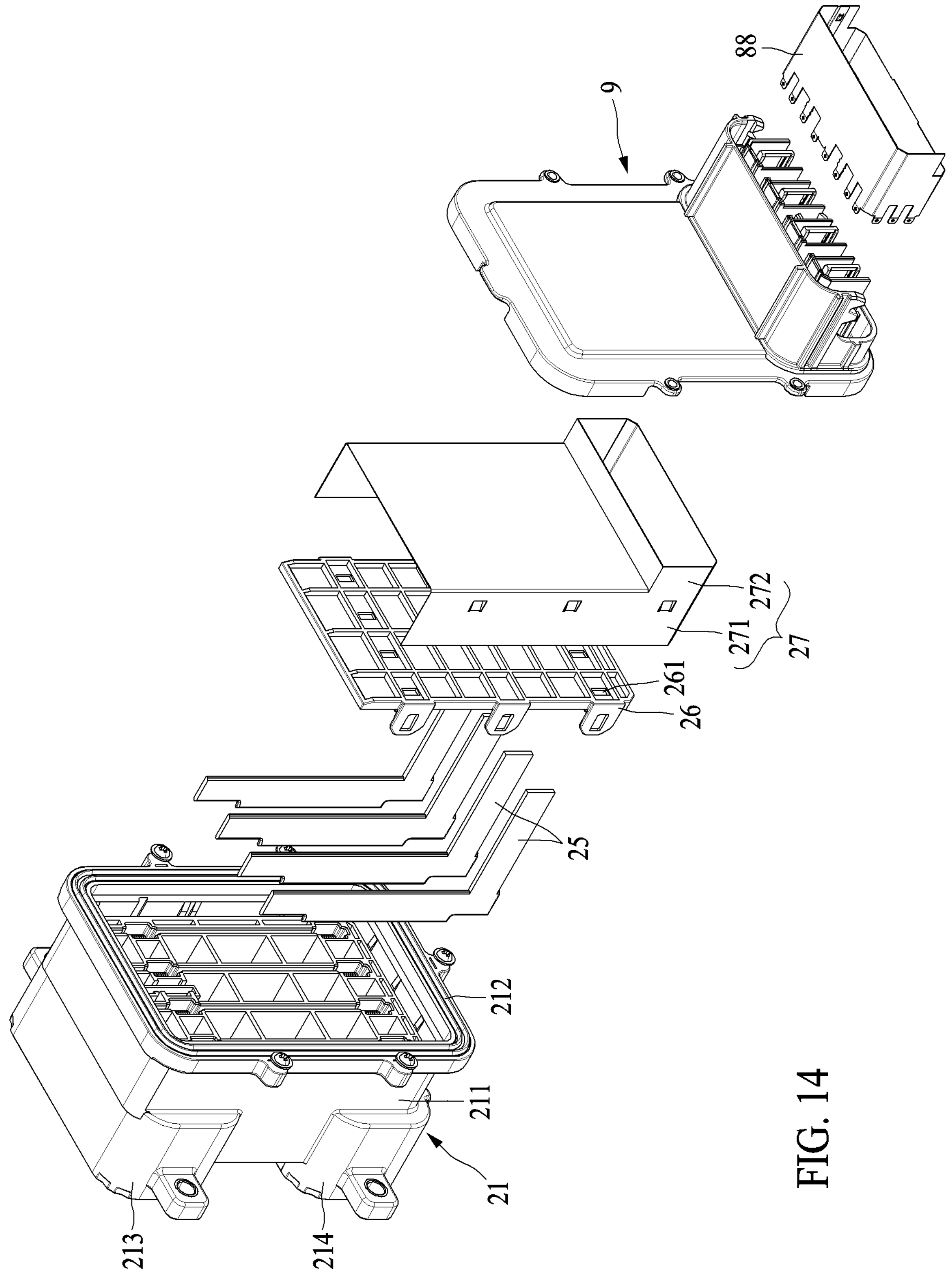
FIG. 14 is an exploded perspective view illustrating the connector according to an embodiment.

FIG. 14 is an exploded perspective view illustrating the connector according to an embodiment.

Referring to FIG. 14, the connector may include a case 21, a bus bar 25, a housing cover 26, an upper shield 27, and a head part 9.

The case 21 may include an input and two outputs. The case 21 may include a case body 211, an input 212, and two outputs 213 and 214. An input and an output may be parallel to each other. The input 212 and the outputs 213 and 214 may be in opposite directions. The bus bar 25 may have a “ㄴ” shape. In this case, the longitudinal direction of the bus bar 25 may be parallel to a direction in which the two outputs 213 and 214 are spaced apart from each other.

The housing cover 26 may include a plurality of cover holes 261 such that a portion of the bus bar 25 may pass through the cover holes 261. A first portion of the bus bar 25 may be on the housing cover 26 and a second portion of the bus bar 25 may pass through the cover holes 261. The first portion and the second portion may be orthogonal. The second portion of the bus bar 25 may pass through the head part 9.

The upper shield 27 may include an upper shield body 271 enclosing the housing cover 26 and an upper shield head 272 protruding from the upper shield body 271. The upper shield head 272 may be connected to a head shield 88. The head shield 88 may be inside the head part 9. The head part 9 may support the upper shield 27 and the bus bar 25 and may assist another external electronic device to be physically and electrically connected to the connector. The head part 9 may integrally include a part supporting the upper shield 27 and a part accommodating the head shield 88.

As described above, the embodiment has been described with reference to specific matters such as specific components and limited embodiments and drawings, but these are provided to help the overall understanding. Also, the present disclosure is not limited to the above-described embodiments, and various modifications and variations are possible from these descriptions by those skilled in the art to which the present disclosure pertains. Accordingly, the scope of the present disclosure is defined not by the detailed description, but by the claims and their equivalents, and all variations within the scope of the claims and their equivalents are to be construed as being included in the disclosure.

What is claimed is:

1. A connector, comprising:

a case having an input and a plurality of outputs;

a terminal housing in the case;

a plurality of terminals in the terminal housing, at least one terminal of the terminals is exposed to an outside through any one of the outputs and is connectable to an external terminal inserted into the case, and another terminal of the terminals is exposed to the outside through another output of the outputs and is connectable to another external terminal inserted into the case; and a bus bar disposed inside the terminal housing and connected to the terminals, at least some of the bus bar is in the input and exposed to the outside of the case, wherein the at least one terminal has a first aperture accommodating the bus bar and a second aperture accommodating the external terminal.

2. The connector of claim 1, wherein the terminals are detachable from the bus bar.

3. The connector of claim 1, wherein the terminals are connected to the bus bar in a direction intersecting a longitudinal direction of the bus bar.

4. The connector of claim 1, wherein each of the terminals includes a plurality of terminal plates parallel to one another in a longitudinal direction of the bus bar.

5. The connector of claim 1, further comprising an inner shield attached to an inner wall of the case and enclosing at least some of the terminal housing.

6. The connector of claim 5, further comprising a head part including a head shield, the head part is connected to the input.

7. The connector of claim 5, wherein the inner shield has a shield outer arm inside one of the outputs.

8. The connector of claim 5, further comprising an upper shield disposed in the case and physically and electrically connected to the inner shield, the inner shield has a shield inner arm overlapping with the upper shield.

9. The connector of claim 5, wherein the inner shield has a first shield attached to an inner wall of any one of the outputs and a second shield attached to an inner wall of another output of the outputs, at least some of the second shield overlaps with the first shield.

10. The connector of claim 9, wherein the first shield has a first shield body inserted into the one of the outputs and a first shield plate extending from the first shield body and overlapping with the second shield.

11. The connector of claim 10, wherein the second shield has a second shield body inserted into the one of the outputs and a second shield plate extending from the second shield body and overlapping with the first shield.

12. The connector of claim 11, wherein the first shield has a first shield head extending from the first shield body, the first shield head is opposite to the first shield body.

13. The connector of claim 1, wherein the terminal housing includes a housing plate in the case and a plurality of accommodating parts connected to the housing plate and accommodating the terminals.

14. The connector of claim 13, wherein the accommodating parts include a front protrusion protruding from the housing plate and enclosed by the one of the outputs and a rear protrusion protruding in a direction opposite to the front protrusion from the housing plate and in the case.

15. The connector of claim 13, wherein the bus bar is in the accommodating parts and spaced apart from the housing plate.

16. The connector of claim 15, wherein the bus bar is inserted into a space between two of the accommodating parts that are spaced apart from each other in a longitudinal direction of the bus bar, the bus bar has a bus bar rib caught by the two accommodating parts.

17. A connector, comprising:

a case having an input and a plurality of outputs;

a terminal housing in the case;

a plurality of terminals in the terminal housing, at least one terminal of the terminals is exposed to an outside through any one of the outputs and is connectable to an external terminal inserted into the case, and another terminal of the terminals is exposed to the outside through another output of the outputs and is connectable to another external terminal inserted into the case; and a bus bar disposed inside the terminal housing and connected to the terminals, at least some of the bus bar is in the input and exposed to the outside of the case, the bus bar is captured by the terminal housing and includes a bus bar body in a plate shape and a bus bar rib protruding from the bus bar body, the bus bar rib is inserted into the terminal housing.

18. The connector of claim 17, wherein some of the terminals are opposite to the other terminals with respect to the bus bar rib.

19. A connector, comprising:

a case having an input and a plurality of outputs;

a terminal housing in the case;

a plurality of terminals in the terminal housing, at least one terminal of the terminals is exposed to an outside through any one of the outputs and is connectable to an external terminal inserted into the case, and another terminal of the terminals is exposed to the outside through another output of the outputs and is connectable to another external terminal inserted into the case;

a bus bar disposed inside the terminal housing and connected to the terminals, at least some of the bus bar is in the input and exposed to the outside of the case; and an inner shield attached to an inner wall of the case and enclosing at least some of the terminal housing.

20. A connector, comprising:

a case having an input and a plurality of outputs;

a terminal housing in the case;

a plurality of terminals in the terminal housing, at least one terminal of the terminals is exposed to an outside through any one of the outputs and is connectable to an external terminal inserted into the case, and another terminal of the terminals is exposed to the outside through another output of the outputs and is connectable to another external terminal inserted into the case, the terminal housing includes a housing plate in the case and a plurality of accommodating parts connected to the housing plate and accommodating the terminals; and a bus bar disposed inside the terminal housing and connected to the terminals, at least some of the bus bar is in the input and exposed to the outside of the case.

* * * * *